(12) United States Patent
Bottazzi et al.

(10) Patent No.: US 6,688,524 B1
(45) Date of Patent: Feb. 10, 2004

(54) METHOD FOR RECONSTRUCTING A BAR CODE THROUGH CONSECUTIVE SCANS

(75) Inventors: Marco Bottazzi, Ferrara (IT); Elena Brunelli, Bentivoglio (IT); Rinaldo Zocca, Bologna (IT)

(73) Assignee: Datalogic S.p.A., Lippo di Calderara de Reno (IT)

( * ) Notice: Subject to any disclaimer, the term of this patent is extended or adjusted under 35 U.S.C. 154(b) by 0 days.

(21) Appl. No.: 09/631,963

(22) Filed: Aug. 3, 2000

(30) Foreign Application Priority Data

Oct. 26, 1999 (EP) .............................. 99830678

(51) Int. Cl.[7] ................................. G06K 5/04
(52) U.S. Cl. ............. 235/462.12; 235/485; 235/462.27; 235/462.16; 235/462.18; 235/462.2
(58) Field of Search ................. 235/462.07, 462.12, 235/462.16, 462.17–20, 462.25, 462.27, 485

(56) References Cited

U.S. PATENT DOCUMENTS

| | | | | |
|---|---|---|---|---|
| 4,570,057 A | * | 2/1986 | Chadima et al. ........... | 235/472 |
| 5,196,685 A | | 3/1993 | Izumi ......................... | 235/462 |
| 5,241,164 A | * | 8/1993 | Pavlidis et al. ............. | 235/462 |
| 5,278,398 A | * | 1/1994 | Pavlidis et al. ............. | 235/462 |
| 5,296,691 A | * | 3/1994 | Waldron et al. ............ | 235/462 |
| 5,319,181 A | * | 6/1994 | Shellhammer et al. ...... | 235/462 |
| 5,387,787 A | | 2/1995 | Waldron et al. ............ | 235/462 |
| 5,965,863 A | * | 10/1999 | Parker et al. .......... | 235/462.25 |
| 6,267,293 B1 | * | 7/2001 | Dwinell et al. ........ | 235/462.12 |

FOREIGN PATENT DOCUMENTS

EP      0 436 072      7/1991

* cited by examiner

*Primary Examiner*—Michael G. Lee
*Assistant Examiner*—Steven S. Paik
(74) *Attorney, Agent, or Firm*—Nixon & Vanderhye P.C.

(57) ABSTRACT

The method for reconstructing a bar code through consecutive scans comprises the following steps: a) carrying out at least one scan of the bar code; b) determining a reconstructed wave form representative of the at least one scan; c) carrying out an actual scan of the bar code; d) determining an actual wave form representative of the actual scan; e) aligning the reconstructed and actual wave forms; and f) combining the aligned wave forms by updating the reconstructed wave form with the actual wave form. The method can directly operate on the photo-sensor signal before carrying out any digitization of it.

43 Claims, 5 Drawing Sheets

METHOD FOR RECONSTRUCTING A BAR CODE THROUGH CONSECUTIVE SCANS

BACKGROUND OF THE INVENTION

1. Field of the Invention

The present invention relates to a method for reconstructing a bar code through consecutive scans.

2. Discussion of Prior Art

As already known, bar codes are largely used in the automatic identification of products.

A bar code is made up of a sequence of light and dark areas which are named space- and bar-type elements. These are rectangular-shaped elements, and each of them can have a different amplitude value. The amplitude of the elements is equal to an elementary value called module, or to multiples of it.

A set of elements univocally represents a character of the code, and a set of characters univocally represents a symbol of a particular code (briefly referred to simply as code). For the purpose of facilitating its location and reading, each code is preceded and followed by quiet zones, that is to say, areas without signs, whose colour corresponds to the background colour on which the bars are printed.

Spaces, quiet zones and background are usually white or, in any case, light, whereas the bars are black or, in any case, dark; this is the case which will be referred to in the following description, for simplicity of exposition. However, the contrary is possible, too.

Each code is defined by a series of rules making up the coding and decoding protocol of that particular type of code. Therefore, a certain sequence of characters matching said protocol represents the decoded symbol of the code being read.

Several methods for scanning and decoding the symbol of a bar code are known. A typical method can be schematised as follows: a device for reading bar codes lights up the code to be decoded along a reading line; the diffused light is collected by a photo-sensor element which, in its turn, generates an analogue signal that is proportional to the intensity of the diffused light.

Bar codes are usually examined according to a scan direction which is not coincident with the longitudinal axis of the code; thus, said scan direction usually forms an angle with the longitudinal axis of the bar code. When this angle exceeds a certain value, only a subset of the elements of the code is scanned; thus, the signal relating to said scan is partial, and it does not allow reading the bar code. Having just partial scans, therefore, there is the problem of "reconstructing" a complete scan of the code from said partial scans (or, with an abbreviation largely used in the field, "reconstructing the code").

In addition, known devices carry out a relative movement between the electro-optical acquisition system of the reader and the objects on which the bar codes are. For example, the electro-optical acquisition system can be of the fixed type, and the objects can be moved, with respect to it, by a movement system, or the reader can be of the portable type, and be moved over the bar codes by an operator.

Other known reconstruction devices are adapted to compose consecutive partial scans, obtained in different positions of the same code, so as to reconstruct and decode the bar code.

Figure 2:
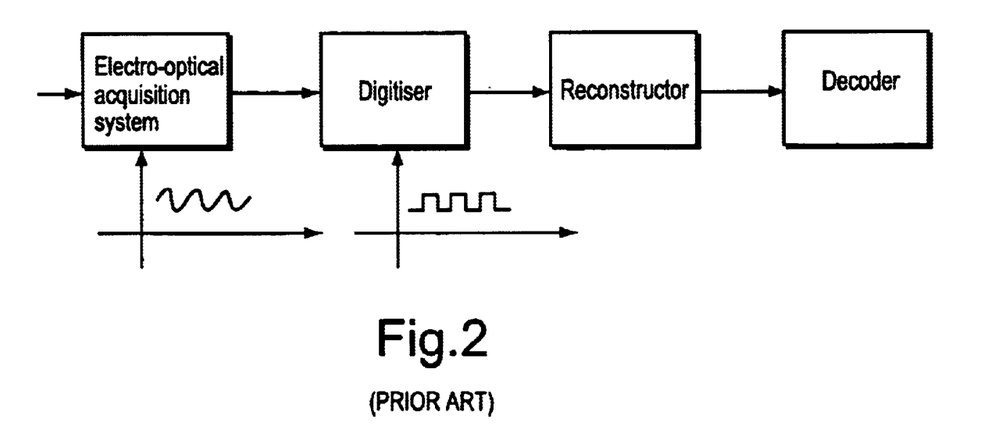
FIG. 2 schematically shows a known method of reconstruction.

Prior-art reconstruction devices may be schematised as in FIG. 2. They use various algorithms, and they are all based on the composition of the characters or of the code elements.

As shown in FIG. 2, the code elements are obtained from the analogue signal, which is obtained by the electro-optical acquisition system, through an operation of digitization. Said digitization essentially consists in squaring the analogue signal, which is reduced to only two values (a high and a low value), and in determining the length of the elements.

The above digitization is a very delicate operation that can generate serious errors in determining the number of elements of the code (by generating errors known as split and merge errors) and in the length of these elements.

For analogue signals affected by faults and distortions such as, for example, blurring, noise and so on, or for reading errors, such as damaged codes or spurious reflexes, the reconstruction and/or the subsequent decoding of the reconstructed code can be compromised.

SUMMARY OF THE INVENTION

Therefore, purpose of the present invention is that of realising a method for reconstructing a bar code through consecutive scans to allow a very precise and reliable reconstruction of the code (for its further decoding) with all types of codes, and in particular, with codes whose signals are affected by faults, distortions and reading errors.

According to the invention, this purpose is achieved by a method for reconstructing a bar code through consecutive scans, said bar code being made up of a plurality of elements having a first and a second reflectivity, characterised in that it comprises the following steps:

a) carrying out at least one scan of the bar code;
b) determining a reconstructed wave form, representative of said at least one scan;
c) carrying out an actual scan of the bar code;
d) determining an actual wave form, representative of said actual scan;
e) aligning said reconstructed and actual wave forms;
f) combining said aligned wave forms by updating said reconstructed wave form with said actual wave form.

Herein and in the following description, the term "scan" refers to the operation of reading a line through the code. Such operation may be carried out in a number of ways, such as for example illumination with a laser scanner, point by point reading through a photodiode (thus, in a temporal sequence), the contemporaneous illumination of the entire line by a LED and simultaneous global reading through a CCD or C-MOS linear sensor (thus, in a spatial sequence).

The term "wave form" refers to the wave form of the analogue signal emitted by the photo-sensor element, possibly processed, but only so that the x-values of the points of the wave form remain directly connected to the temporal or spatial sequence of the different measurement instants or points during a scan.

Differently from the prior art, therefore, the invention can directly operate on the signal of the photo-sensor, before carrying out any digitization of it. This is extremely advantageous because the digitization causes a strong reduction in the information contained in the signal, and said reduction is not recoverable in the following steps. It is also true that usually, the above reduction of information content does not directly hinder the decoding of a bar code, but it has been proved that it can be very disadvantageous during the reconstruction; the reconstruction based on the entire signal is much more precise and reliable for it is based on more information. It must also be taken into account that inaccuracies during the reconstruction often generate errors while decoding.

The aforesaid reconstruction process, with the listed minimum steps from (a) to (f), can be used to combine two or more scans one with another. Preferably, said method is iteratively applied, and thus comprises the following step:

g) iterative repetition of the steps from (c) to (f) until the reconstructed wave form is representative of the entire bar code.

As already said, a very important advantage of the invention is the use of wave forms rich in information content. This information content ensures that it suffices often to use just some properly selected points of the wave forms, and not all of them. In particular, according to a preferred embodiment of the invention, steps (b) and (d) are respectively followed by the following steps:

b') determining a first series of points on said reconstructed wave form;

d') determining a second series of points on said actual wave form.

Preferably, said series of points have the same interval, that is to say, each point of the series is separated by an identical distance or by an identical time interval from the following point.

Preferably, the wave forms are analogue, and said series of points are obtained through the sampling of the analogue wave forms.

The number of points provided in each series can be different; preferably, it is of at least 1.5 points for each module of the code to be read. More preferably, it is equal to about 5 points for each module.

Preferably, said series of points are values of brightness expressed in grey scales obtained from an image of the bar code, such as that obtainable with a CCD or C-MOS linear sensor.

The series of points can comprise all the points obtained through the sampling of the analogue wave forms, or preferably, only a subset of them. Said subset, for example and preferably, can comprise:

the maximums and the minimums of the points obtained through the sampling of the analogue wave forms;

the points in which the first derivative of the analogue wave forms crosses zero;

the points in which the second derivative of the analogue wave forms crosses zero.

In an alternative embodiment, the wave forms are two-level digitized wave forms, and said series of points are obtained through the sampling of the two-level digitized wave forms.

Preferably, the alignment step comprises the following steps:

forecasting an expected alignment;

carrying out a rough translation between the two wave forms on the basis of the expected alignment;

calculating a correlation index of the two wave forms;

carrying out a fine translation of a fixed number (M) of steps between the two wave forms in both directions;

calculating the correlation index for each fine translation;

determining—between the calculated correlation indexes—the index indicative of the minimum difference between the two wave forms;

aligning the two wave forms on the basis of the fine translation to which the determined correlation index corresponds;

updating the expected alignment value on the basis of the above fine alignment.

It has been proved that an alignment thus carried out, allows obtaining a great precision. A fundamental aspect of this preferred method is the use of the correlation index; these terms refer to a number which is calculated according to a comparison of the point-by-point values of the wave forms. It can be a distance index, calculated for example as a function of the summation of values function of the step-by-step difference between the values of the two wave forms; alternatively, it can be a proximity index, function of the summation of values function of the step-by-step product between the values of the two wave forms.

Thanks to the correlation index, it is possible to express the degree of similarity (or of diversity) between the two temporal wave forms with a single numerical value; this approach significantly facilitates the comparisons between wave forms.

Preferably, the calculation of the correlation index only considers the values of the two wave forms that are sufficiently close to one another. The exclusion from the calculation of the values relating to those points of the wave forms that are too different from one other allows not considering the points that are clearly affected by a reading error in at least one of the wave forms; in fact, the difference of the two wave forms caused by said errors does not influence their alignment.

Preferably, the combining step (f) comprises the following steps:

fa) determining a central superimposition area between the aligned reconstructed wave form and the actual wave form, an initial area, in which there is only the reconstructed wave form, and a final area, in which there is only the actual wave form, fb) selecting, area by area, at least one of said reconstructed and actual wave forms;

fc) updating the reconstructed wave form on the basis of the selected wave form.

More preferably, the selection step (fa) comprises:

in the initial area, point-by-point selection of the value of the reconstructed wave form;

in the central superimposition area, point-by-point selection of a value calculated as a function of the corresponding values of the reconstructed wave form and of the actual wave form;

in the final area, point-by-point selection of the value of the actual wave form.

The calculated value can be obtained in different ways. In an embodiment which is preferred for its simplicity, the calculated value is an average of the corresponding values of the reconstructed wave form and of the actual wave form; this calculation can be easily applied whatever the number of actual wave forms considered for the comparison may be.

However, if the actual wave forms considered are more than one, it can be preferable that the calculated value is chosen through a voting mechanism between the values of the reconstructed and actual wave forms; this means that the most frequent value among those of the different wave forms is chosen point-by-point. More preferably, the differences between the values relating to corresponding points of the wave forms are calculated two by two, whereas the values differing from the others by more than a fixed tolerance are rejected, and the calculated value is chosen as average of the values not rejected.

If the wave form is a two-level digitized wave form, the calculated value can advantageously be chosen through congruence rules with respect to the code syntax. In fact, the two-level digitized wave form actually provides the dimensions of the single elements (bar or space) of the code: in fact, a minimum or maximum value in said wave form means a space or bar element whose length is proportional to the number of points for which this value remains constant. Thus, it is possible and also very easy to check whether the sequences of elements and their lengths are congruent with the syntax of the code being read; the type of code being read can thus be previously known, or it can be determined by decoding the character of initial synchronism.

The method of the invention preferably provides for an initial acquisition step which comprises the following steps:

searching two consecutive wave forms in which there is a portion which can be representative of an end portion of a code preceded and/or followed by a possible quiet zone, acquiring said wave forms as first and second wave form;

aligning the second wave form with the first wave form;

determining a superimposition area between the second wave form and the first wave form;

carrying out an initial construction of the reconstructed wave form in the superimposition area with data function of the data of the first wave form and of the data of the second wave form;

carrying out an initial construction of the reconstructed wave form in the area following the superimposition area with the data of the second wave form;

carrying out an initial calculation of the expected alignment on the basis of the alignment between the first and the second wave form.

In this way, the reconstruction process starts when something similar to a code is detected; this means, an area in which the wave form presents significant variations of the reflectivity value (possible portion of code) sided by an area in which the reflectivity value is substantially steady (possible quiet zone).

Preferably, the alignment step of the second wave form with the first wave form comprises the following steps:

recognising the apparent quiet zones of the first and second wave form;

carrying out a rough translation between the two wave forms on the basis of their respective apparent quiet zones;

calculating a correlation index of the two wave forms;

carrying out a fine translation between the two wave forms, of a fixed number (M) of steps in both directions;

calculating the correlation index for each of the fine translations;

determining—between the calculated correlation indexes—the index indicative of the minimum difference between the two wave forms;

aligning the two wave forms on the basis of the fine translation to which the determined correlation index corresponds;

setting the expected alignment value on the basis of the above fine alignment.

In this way, the already explained method of alignment in two steps (rough alignment and fine alignment) is advantageously used also at the initial step of acquisition; in addition, a useful starting value for the expected alignment is obtained.

Preferably, the step of recognition of the apparent quiet zones comprises the following steps:

translating the second wave form with respect to the first wave form on the basis of the two respective possible initial quiet zones;

calculating a correlation index of the two wave forms;

translating the second wave form with respect to the first wave form on the basis of the two respective possible final quiet zones;

calculating a correlation index of the two wave forms;

determining—between the calculated correlation indexes—the index indicative of the minimum difference between the two wave forms;

recognising as apparent quiet zone of the code the probable—initial or final—quiet zone that has caused the translation to which the determined correlation index corresponds.

It is thus possible to easily and safely determine whether the two portions of wave form comprise either the beginning or the end of the code by using a correlation index. Preferably, said correlation index is determined according to what previously said about the fine alignment step.

BRIEF DESCRIPTION OF THE DRAWINGS

Further features and advantages of a method according to the present invention will appear more clearly from the following detailed description of some preferred embodiments, made with reference to the attached drawings.

In such drawings.

DETAILED DISCUSSION OF PREFERRED EMBODIMENT

Figure 1:
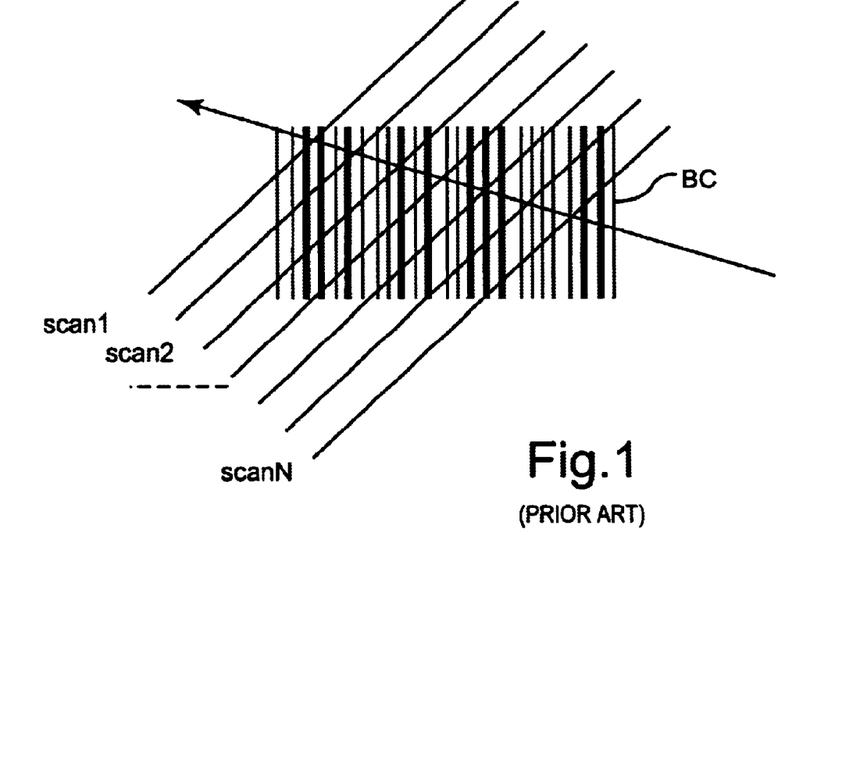
FIG. 1 schematically shows reading of a bar code.

FIG. 1 schematically shows the reading of a bar code BC by a sequence of scans, referred to as scan1, scan2 . . . scanN. This situation occurs, for example, if an object bearing code BC moves on a feeding surface with respect to a fixed reader, or vice versa. The figures do not show in detail any reader or electro-optical acquisition system, being this component conventional in itself and essentially not relevant to the invention; thus, it can be of any type, for example of the laser-ray type with photodiode, or of the LED type with CCD or C-MOS.

Figure 3:
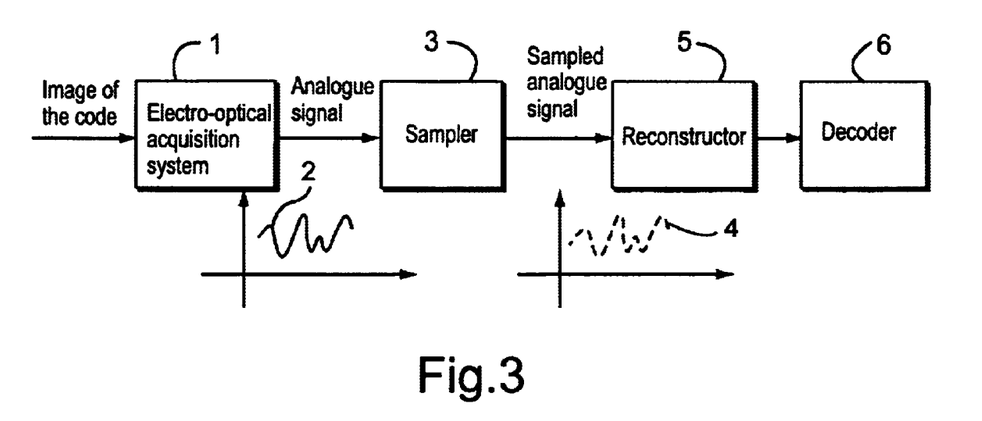
FIG. 3 schematically shows some aspects of the reading according to a first embodiment of the invention.

An analogue signal 2 is obtained from both electro-optical acquisition systems (see FIG. 3). In the case of laser with photodiode (single light-sensitive element), said wave form is given by the temporal (or spatial) sequence of the signal generated by the photodiode as the laser beam passes over the code. In the case of LEDs with CCD or C-MOS (many light-sensitive elements), the data is extracted in sequence (one pixel after the other) from the single sensor elements, so as to obtain again the wave form 2 of FIG. 3.

In the example shown in FIG. 1, there is the necessity of using data obtained from different scans; differently, the reading of code BC is impossible also in case of total absence of defects and of reflection problems, because of the reciprocal inclination between code BC and the scan lines; in fact, no scan can cover the entire code. Thus, to do so, it is necessary to reconstruct the code. According to a first embodiment of the invention, the following method can advantageously be used in the reconstruction.

As schematised in FIG. 3, a reader or an electro-optical acquisition system 1 generates an analogue signal 2 over time, on the basis of the collected light and thus, of the reflectivity value of the portion of code (or of non-code) subject to the scan.

The analogue signal 2 is then sampled by a sampling converter 3, which generates a sampled analogue wave form 4, obtained from the analogue wave form by keeping of it only the points corresponding to fixed instants of sampling.

The sampling consists of selecting, measuring and storing the luminosity value of the wave form 2 in a series of points of the axis of abscissas. A minimum number of sampling points is needed for the sampling to ensure that the sampled wave form can be reconstructed. The inventors have found that, for the purposes of the present method for reconstructing the code, the minimum number of points for the sampling is equal to 1.5 points per module. For example, for a code scan of the type 128, containing about eight characters (corresponding to 50 elements and 93 modules), there are about 140 sampling points.

A preferred number of sampling points is five per module; in this case, in the above example, there are about 460 sampling points.

The examples above clearly show that the information content remaining after the reconstruction of the scan through the sampled wave forms (140 or 460 data) is extremely richer than that of reconstruction with the characters (8 data) or the elements of the code (50 data); thus it allows reaching significantly better results with respect to the prior art.

The more the number of sampling points is increased, the more the sampled wave form is similar to the starting analogue wave form. The inventors have found that, with 100 sampling points per module, the sampled wave form is substantially equal to the starting analogue wave form.

The sampled analogue wave form 4 is then transferred to a reconstructor block 5 to reconstruct the code, and then, to a decoding block 6.

The origin of the axis of abscissas (time or space) for the wave forms 2 and 4 in FIG. 3 coincides with the beginning of the scan. The y-value can be seen as a value of the reflectivity of the point of code (or non-code) being read in that moment.

Figure 4:
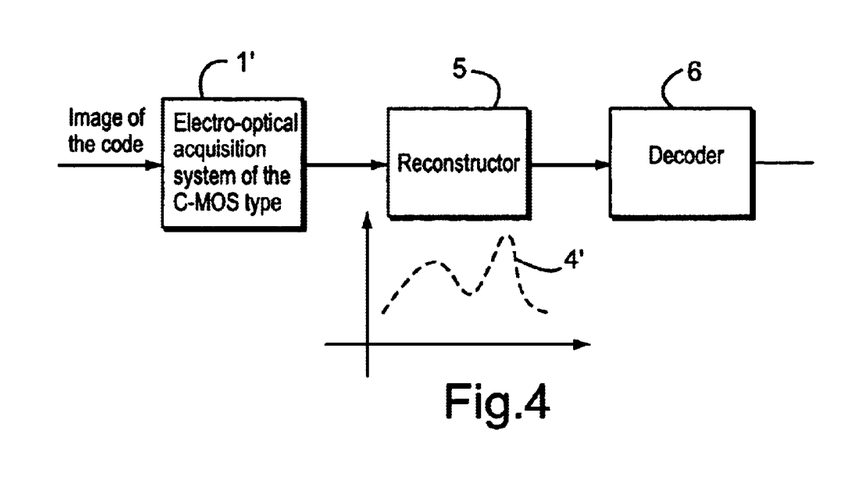
FIG. 4 is similar to FIG. 3, but it refers to an electro-optical acquisition system of the C-MOS type, which provides an already sampled signal.

FIG. 4 shows a reader having an electro-optical acquisition system comprising a linear C-MOS sensor 1'. This type of sensor is characterised in that in output it gives a digital signal 4' (representative of the single scan of the bar code), that is to say, each pixel is associated with a number expressing the grey scale of that point, or the luminosity of that point. In other words, an electro-optical acquisition system of the C-MOS type gives an already sampled analogue signal in output.

Once the sampled wave form (or series of points) has been obtained, it is possible to start the reconstruction. The method of reconstruction starts when two consecutive scans are acquired, a first and a second scan (the latter containing more information), which both present a portion representative of a possible code, and at least one adjoining portion representative of a possible quiet zone. For this purpose, it is possible to determine an area in which the signal presents very limited variations over time, followed or preceded by an area in which, on the contrary, the signal has very marked variations over time, on the further condition that the area having limited variations is sufficiently wide with respect to the difference of position of the variations in the other area. The above expressions "very limited", "very marked", "sufficiently wide" (as well as other similar expressions in the present text) mean that a verification is carried out with respect to a fixed threshold; for example, it is checked whether the variations in a first area are lower than a certain threshold S1; whether the variations in a second area adjoining the first one are greater than a threshold S2, and whether the extension of the first area is greater than S3 times the temporal distance between any of two consecutive variations of the second area.

Afterwards, the first and second scans are aligned. In theory, said alignment can be made in two positions; in fact, the portions of possible code may probably be sided by portions of possible quiet zones at both ends, because often the code has not only the quiet zones (which are compulsory) at its ends, but usually it is also sided by lateral light areas. Thus, it is not previously known which of the two ends of the portions of possible code actually is the end of the code, that is to say, it is not previously known which the actual quiet zone is.

Thus, both possible alignments are carried out, that is, by translating the second scan with respect to the first one so as to superimpose first the possible initial quiet zones, and then the possible final quiet zones.

Figure 5A:
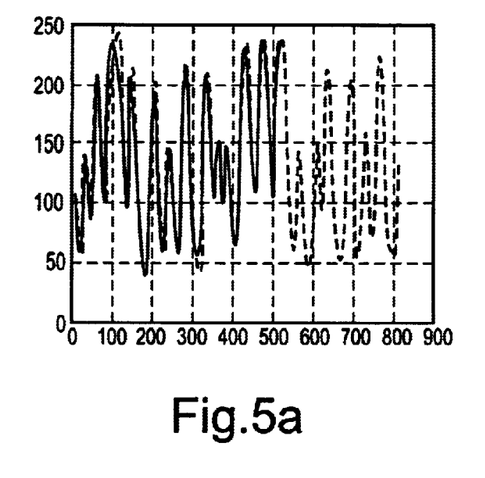
FIGS. 5a, 5b and 6 show steps of the reconstruction method according to the first embodiment of the invention.
Figure 5B:
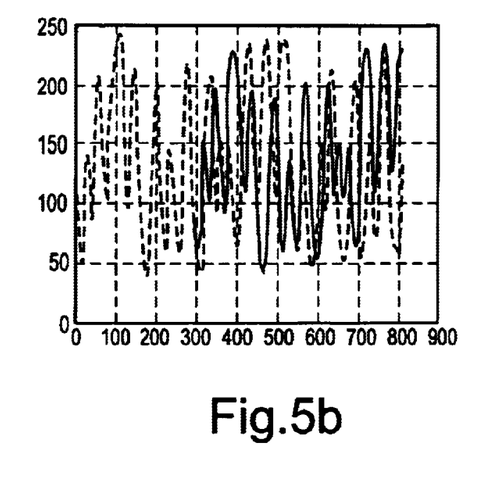

This operation is schematically shown in FIGS. 5a and 5b. Said figures show a first wave form with a continuous line, and a second wave form with a dashed line; it must be noted that the above lines are only simplifications of graphic representation, whereas both the first and the second wave forms are in any case sampled analogue wave forms, thus, made up of a sequence of points. In figure 5a, the two wave forms are aligned on the left, whereas in FIG. 5b they are aligned on the right.

For the purpose of deciding which is the correct alignment, a correlation index between the two aligned wave forms is calculated in each of the two cases; the characteristics and the methods of calculation of said index will be described later on. Thus, the correct alignment chosen is that to which a correlation index corresponds indicative of a greater similarity between the two wave forms; as it will be explained in the following description, this can be the lower index if it is a distance index, or the greater index if it is a proximity index. In the case shown in FIGS. 5a and 5b, the correlation index should make you choose the alignment in FIG. 5a as being the correct one.

At this point, the second wave form is memorised, and gradually, the results of the following scans are added to it; the wave form "under construction" therein memorised is here called "reconstructed wave form", while the various wave forms obtained from the following single scans are called "actual wave forms".

Figure 6:
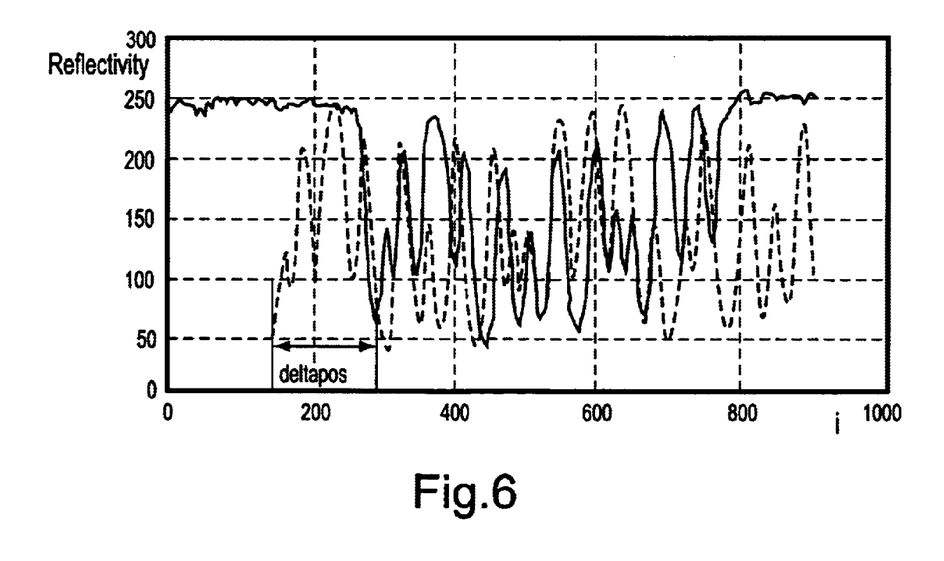

From the initial alignment, it is possible to know the direction in which the code must be reconstructed (rightwards, in the case in FIG. 5a), and it is possible to obtain an expected alignment value equal to the translation needed to align the first two scans; that is to say, in a first approximation, the translation needed to align the next scan and the second scan is assumed to be equal to that between the second and the first scan. Clearly, this assumption is as close to the truth, the more constant the relative velocity between the code and the reader is. FIG. 6 shows two superimposed wave forms without translation, thus showing that the expected alignment (referred to as DELTAPOS) can be calculated as difference of position of two points of minimum or of maximum; for a more precise calculation, it is possible to consider the average of the values calculated in correspondence of the different points of maximum and minimum.

In the initial step of acquisition, it may be preferable to introduce an acceptability threshold for the correlation index between the two wave forms so as to avoid starting the reconstruction process if the two first and second wave forms are not very similar in their superimposed tract.

From the reflectivity values of the first and second wave forms, specifically from the differences between the values of the two wave forms in the single corresponding points, it is possible and preferable to obtain a tolerance value to, be used for the rest of the procedure, when—as it will be described afterwards—it will be necessary to decide whether or not two corresponding values are sufficiently similar to one another. Said tolerance value can, for example, be calculated as multiple for some units of the maximum difference that corresponding points in the two wave forms have.

After the initial acquisition step, consecutive scans are performed for the purpose of adding other portions to the reconstructed wave form until the entire code is reconstructed.

At each scan, an actual wave form is then memorised and aligned with the reconstructed wave form.

For this purpose, starting from the memorised DELTAPOS expected alignment value, a rough alignment is carried out by translating the actual wave form of DELTAPOS with respect to the reconstructed wave form. If the velocity of the relative movement between object with code and reader is perfectly constant, said rough alignment should in theory be already sufficient to correctly align the two wave forms. Actually, however, this is not true, both because the velocity is never exactly constant, and because of unavoidable measurement inaccuracies. Thus a fine alignment step is then carried out.

In the fine alignment, small translations of the actual wave form are carried out with respect to the reconstructed wave form, with respect to the expected position, in both directions; for each translation, a correlation index with the reconstructed wave form is calculated and memorised. Typically and preferably, the actual wave form is translated into one direction and into the other one by 1, 2, . . . M quantities equal to the same temporal sampling unit. The 2M+1 correlation indexes thus obtained are indicative of the 2M+1 conditions of translation proved; then, the alignment selected is that in correspondence of which the correlation index has shown the maximum similarity between the two wave forms. Finally, the value of the expected alignment DELTAPOS is updated on the basis of the alignment chosen.

The correlation index can essentially be of two types: a distance index (the higher it is, the more the two wave forms are different) or a proximity index (the higher it is high, the more the two wave forms are similar). In both cases, said index is calculated as summation for all the superimposition points of the two wave forms of values that are function of the respective values of the two wave forms.

For example, as distance index it is possible to use the one expressed by the following formula:

$$d(j) = \frac{\sum_{i=1}^{n} |a_i - r_i|}{n}, \forall j \in [-M, M], \quad (1)$$

or that expressed by the following formula:

$$d(j) = \frac{\sum_{i=1}^{n} (a_i - r_i)^2}{n}, \forall j \in [-M, M], \quad (2)$$

or also the index expressed by the following formula:

$$d(j) = \left[\frac{\sum_{i=1}^{n} |a_i - r_i|^p}{n}\right]^{\frac{1}{p}}, \forall j \in [-M, M]. \quad (3)$$

In all three cases, i is the sampling index, and it varies for the entire superimposition area of the two waveforms, so that $r_i$ and $a_i$ take in sequence all the reflectivity values of the reconstructed wave form and of the actual wave form respectively; n is the number of the sampled points comprised in the superimposition interval; j is the variable standing for the 2M+1 alignments for which the distance index is calculated; p is an integer.

In practice, in the first case we must calculate the difference (in absolute value) of the reflectivity values of the actual wave form $a_i$ and of the reconstructed wave form $r_i$ for each point i of the superimposition interval; add up all the differences and calculate an arithmetical average; all this must be repeated for each of the 2M+1 positions j of verification of alignment.

In the second case, we must calculate the difference of the reflectivity values of the actual wave form $a_i$ and of the reconstructed wave form $r_i$ for each point i of the superimposition interval; square each difference; add up all squared differences and calculate their an arithmetical average; all this must be repeated for each of the 2M+1 positions j of verification of alignment.

Finally, in the third case we must calculate the difference (in absolute value) of the reflectivity values of the actual wave form $a_i$ and of the reconstructed wave form $r_i$ for each point i of the superimposition interval; raise each difference to the p-th power; add up all the differences raised to p and calculate their arithmetical average, raising the result to the 1/p-th power; all this must be repeated for each of the 2M+1 positions j of verification of alignment.

As proximity index, it is possible to use the one expressed by the following formula:

$$p(j) = \frac{\sum_{i=1}^{n} (a_i * r_i)}{\sqrt{\sum_{i=1}^{n} a_i^2 * \sum_{i=1}^{n} r_i^2}}, \forall j \in [-M, M], \quad (4)$$

where the symbols have the already explained meaning.

It is possible to verify that the formula (4) converges to 1 in the case of very similar wave forms, whereas it converges to zero in the opposite case.

Preferably, the points for which the two wave forms present clearly different values (that is to say, have a greater difference than the fixed tolerance, determined at the initial alignment step or otherwise) are not considered into the calculation; in fact, this eventuality is a sign of a reading error, and it is preferable that it has no weight in the evaluation of the alignment conditions.

Once the actual wave form has been aligned with the reconstructed one, it is necessary to proceed to the comparison of the two wave forms and to the selection of their data.

In general, three areas are determined: an initial area of the reconstructed wave form to which no area of the actual wave form corresponds; a central superimposition area, and a final area of the actual wave form to which no area of the reconstructed wave form corresponds.

Thus, the reconstructed wave form is updated as follows: it remains unaltered in the initial area (that is to say, the data is definitively acquired); in the final area, the reconstructed wave form remains equal to the actual wave form; in the central superimposition area, the reconstructed wave form is updated with values that are function of the values taken, point-by-point, by the two wave forms in said area.

This function can be of different types. For example, it is simply possible to make a step-by-step measurement of the average of the values of the two wave forms, or to take one (maximum or minimum) of the two values. This approach is certainly valid in the case of high-quality printed codes that are clearly read, without reflections or other faults. In fact, the two portions of wave forms will be very similar to one another.

However, if there are reading faults (due to defects in the code printing or to reflections), there will be points in which the reflectivity values of the two wave forms are slightly different from one another; since this difference is caused by the presence of a reading error in at least one of the two wave forms, making the average of the values would mean giving importance to this error.

Thus, if the reconstruction method must be effective in the presence of reading errors, it is preferable to use not just one but several actual wave forms. Each of them will be aligned with the wave form established as explained above, after which, comparison and selection are carried out through a voting mechanism between the values of the reconstructed and actual wave forms. The expression "voting mechanism" means that for each point, the values of the different wave forms are compared with one another. Those having little difference with one another (less than the fixed tolerance threshold) are regarded as being equal; thus, the most frequent value is searched and adopted. As with all voting mechanisms, it is preferable that the number of actual wave forms considered is even and therefore, the overall number of wave forms (reconstructed plus actual wave forms) is odd. In case, it is also possible to match a voting mechanism with some averages so as to average results that are almost equal with one another.

Figure 7:
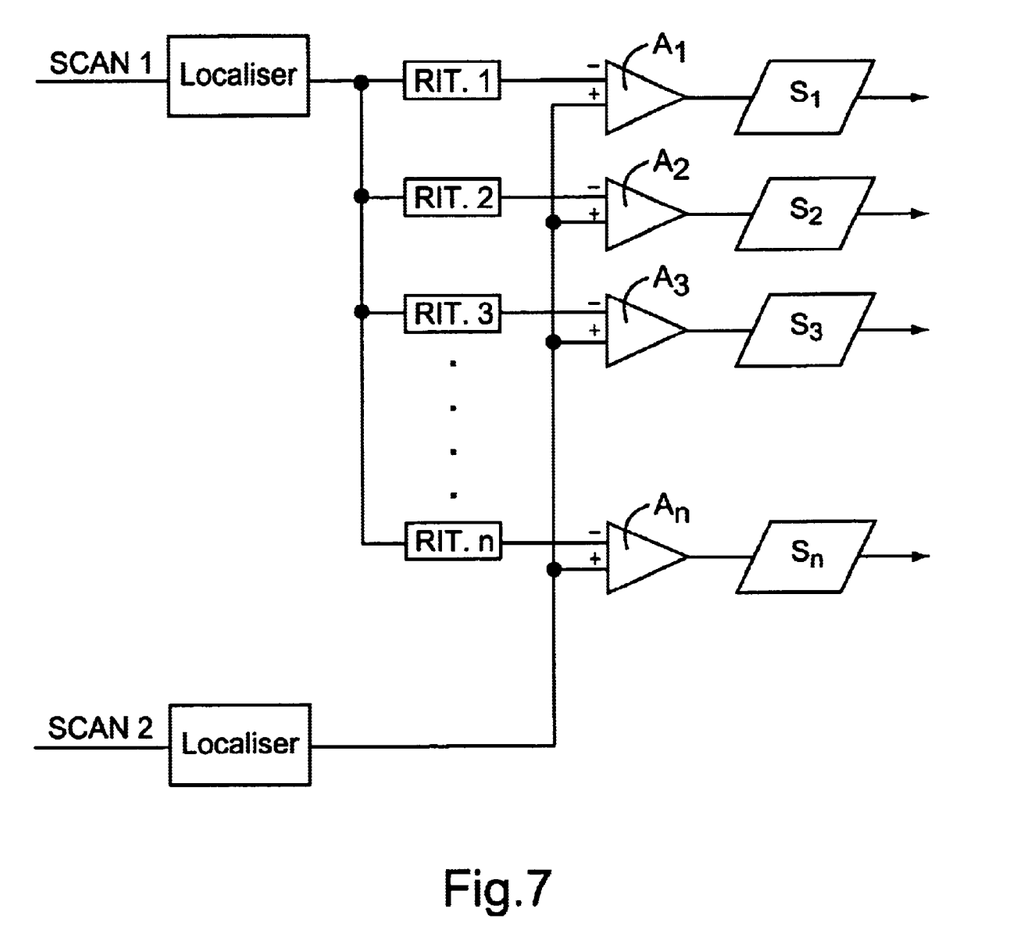
FIG. 7 schematically shows some aspects of the reconstruction according to an embodiment of the invention.

Another solution for the reconstruction of analogue wave forms is shown in FIG. 7. In this solution, the analogue wave form is localised first, that is to say, the beginning and the end of a part of the code are found in the scan. The localiser can be a simple digitizer or else.

Afterwards, the first wave form (for example, the one referring to scan1) is sent on several delay lines (RIT1, RIT2, . . . RITn) placed in parallel. Each delay line delays the first wave form by increasing units of time (1, 2, . . . n). All delayed wave forms are compared with the second wave form (belonging, for example, to scan2) by operational amplifiers A1, A2, . . . An. The operational, amplifiers are provided in output with blocks S1, S2, . . . Sn, which calculate a correlation index between the two wave forms according to the same formulas 1–4 already described. As in this case the wave forms are continuous quantities, the summations become integrals.

The block S giving the minimum (or maximum) output indicates which of the delayed wave forms is aligned (for example, scan1+RIT3) with the second wave form. With this operation, the wave forms have been aligned and the DELTAPOS has been calculated (in the example, it is RIT3).

Once aligned, the two scans must be combined. For this purpose, the indications of the two localisers are used. The first localiser gives the point where the reconstructed wave form begins, while the second localiser gives the point where the actual wave form ends. Once the starting and the ending points have been fixed, the two wave forms are put together. For the superimposition area, it is possible to take the first or the second wave form. It must be noted that also the starting point of the first wave form must be moved by DELTAPOS.

Once DELTAPOS has been calculated, from the third scan on it is possible to carry out a rough alignment with DELTAPOS. Also in this case, a fine alignment step may follow. The forward and backward steps of the two wave forms are obtained by some delays to one wave form or to the other.

According to other embodiments of the invention, instead of using a sampled analogue wave form of the first embodiment, it is possible to use a temporal wave form obtained from it.

In particular, according to a second embodiment of the invention, it is possible to use a two-level digital wave form. As schematised in FIG. 8, a reader or electro-optical acquisition system 11 generates an analogue signal over time 12, that is function of the collected light and thus of the reflectivity value of the portion of code (or of non-code) subject to the scan.

Figure 8:
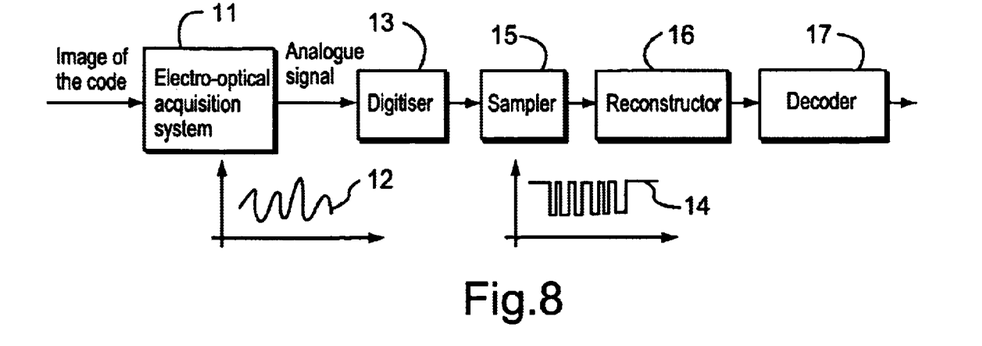
FIG. 8 schematically shows some aspects of the reading according to a second embodiment of the invention.

The analogue signal 12 is then digitized by a digitizer 13 and then sampled by a sampler 15, thus generating a two-level digital wave form 14, obtained from the analogue wave form by maintaining of it only the points corresponding to fixed sampling instants and normalising the y-values (the reflectivity values) only onto two levels, minimum and maximum. It must be noted that the broken continuous line of the two-level digital wave form is just a simplification of drawing; in fact, said wave form is in any case made up of a sequence of points, placed on the minimum or on the maximum level, each corresponding to an x-point which is equal to the sampling instant. The sampled two-level digital wave form 14 is then transferred to a reconstructor block 16 to reconstruct the characters of the code and then, to a decoding block 17.

All the steps of procedure shown with reference to the sampled analogue wave form can be applied to the sampled two-level digital wave form; thus, they will not be repeated further.

The advantage of this solution with respect to the prior art is in the fact that the two scans can be aligned with the wave forms by means of the correlation index, thus obtaining an alignment precision which is much greater than that obtained by aligning the elements of the code.

In addition, with the sampled two-level digital wave form it is advantageously possible to use steps of procedure which consider the fact that the sequences of points of the wave form are directly connected to the length of the elements (bar and space) of the code being read: in fact, a minimum or maximum value in said wave form means a space or bar element, the length of which is proportional to the number of points for which this value remains constant.

Thanks to the information on the length of the elements and on their number, at the steps of comparison and selection of the superimposed areas of the two wave forms and, above all, in case of reading errors, it is then possible to apply congruence criteria with respect to the type of code, which can be obtained by decoding the initial or final synchronism character. The computational load introduced by the decoding of the synchronism character is largely balanced by the greater velocity obtainable by using congruence criteria.

There are several possible congruence criteria.

For example, knowing the type of code, the number of elements making up each character is known, as well as the number of elements whose length must be equal to one module and the number of elements whose length must be equal to a multiple of the module. In addition, by decoding the synchronism character, it is possible to determine the x-interval corresponding to a character on the wave form.

Figure 9:
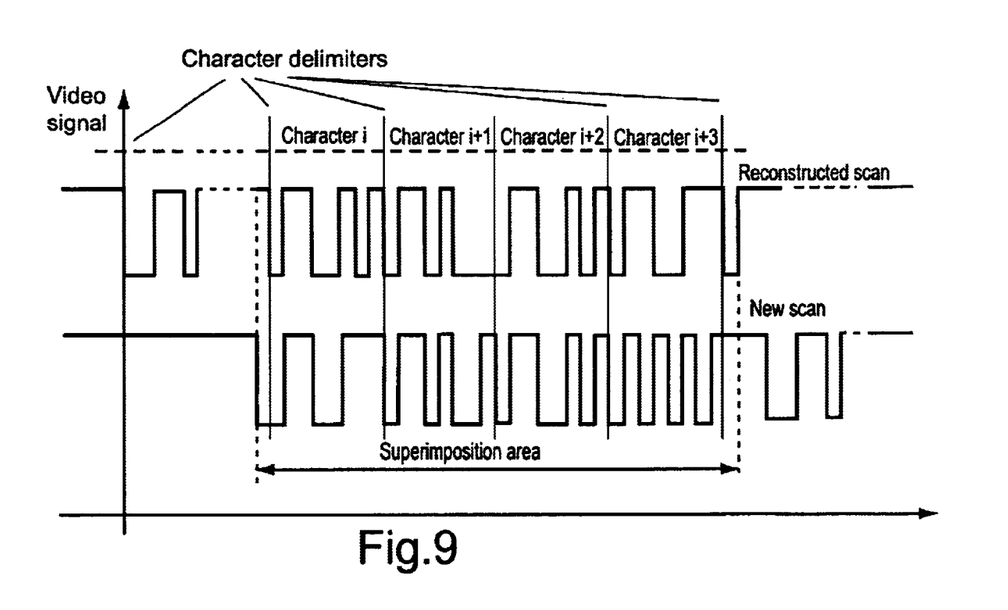
FIG. 9 shows an aspect peculiar to the second embodiment of the invention.

It is thus possible to divide the wave forms in sections corresponding to single characters, as shown in FIG. 9. Then, at the selection step it will be easy to reject the values that are not congruent with the code syntax. Always with reference to FIG. 9, supposing that each character of the code is made up of six elements, four of which are one module long, and two of which are long twice the module (features that are used here only as example, and not corresponding to any real code), it is easy to carry out a selection character by character, rejecting each time those not complying with the congruence; for example, in FIG. 9 it can be noted that:

for character i, the actual wave form certainly provides incorrect information (four elements), and then the reconstructed wave form (which has six elements, as provided for by the code syntax) is not changed;

for character i+1, the reconstructed wave form has five elements (certainly incorrect information) and is then updated with the actual wave form, which has six elements;

for character i+2, both wave forms comply with the congruence criteria; thus, the reconstructed wave form is left unaltered;

for character i+3, no wave form complies with the congruence criteria; thus, the reconstructed wave form is left unaltered.

As it can be easily understood, it is possible to determine a lot of other congruence criteria, more or less complex, that are always connected to the synctactic rules of the codes.

According to a third type of embodiment of the invention, instead of the sampled analogue wave form of the first embodiment it is possible to use another temporal wave form obtained from it by maintaining only its maximums and minimums.

Figure 10:
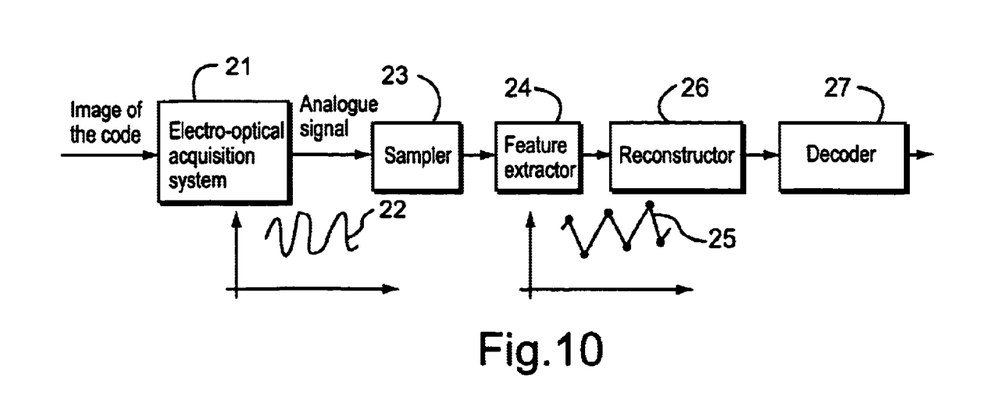
FIG. 10 schematically shows some aspects of the reading according to a third embodiment of the invention.

As schematised in FIG. 10, a reader or electro-optical acquisition system 21 generates an analogue signal over time 22, on the basis of the collected light and thus, of the reflectivity value of the portion of code (or of non-code) subject to the scan.

The analogue signal 22 is first sampled by a sampler 23, and then is processed by a feature extractor 24, which generates a wave form 25, obtained from the sampled analogue wave form by maintaining of it only a subset of characteristic points, such as for example the relative minimum and maximum points. Other subsets of characteristic points of the sampled wave form that the feature extractor 24 can extract are, for example, the points in which the first derivative crosses zero, or the points in which the second derivative crosses zero, or else. It must be noted that the broken continuous line of the wave form 25 is just for explanatory purposes; in fact, said wave form is in any case made up only of the sequence of points marked with a dot. The wave form 25 is then transferred to a reconstructor block 26 to reconstruct the code, and then, to a decoding block 27.

All the steps of procedure shown with reference to the complete sampled analogue wave form can be applied—if properly adjusted—to the wave form sampled only with the points of maximum and minimum; thus, they will not be repeated further. The main adjustment is due to the fact that the points of two wave forms will have not only a different ordinate, but possibly also a different abscissa; thus, all comparisons will have to be carried out both for the reflectivity values and for the time (or space) values.

For example, the formula (1) for calculating a distance index can be replaced by the following one:

$$d(j) = \frac{\sum_{i=1}^{n} |ax_i - rx_i| + \sum_{i=1}^{n} |ay_i - ry_i|}{n}, \forall j \in [-M, M]. \quad (5)$$

Similarly, the formula (2) can be replaced by the following one:

$$d(j) = \frac{\sum_{i=1}^{n} (ax_i - rx_i)^2 + \sum_{i=1}^{n} (ay_i - ry_i)^2}{n}, \forall j \in [-M, M]. \quad (6)$$

In these formulas, i is the sampling index, and it varies for the entire superimposition area of the two wave forms, so that $rx_i$ and $ax_i$ take in sequence all the reflectivity values of the reconstructed wave form and of the actual wave form, respectively; n is the number of the sampled points comprised in the superimposition interval; j is the variable standing for the 2M+1 alignments for which the distance index is calculated. The skilled in the art will easily understand which adjustments must be made to formulas (3) and (4).

In addition to the procedures shown with reference to the sampled wave form, with the wave form made up of maximums and minimums it is advantageously possible to use procedural steps that consider the greater quantity of information available; in fact, the minimums are connected to bar elements, whereas the maximums are connected to space elements, and the distances between consecutive minimums and maximums are connected to the amplitudes of the elements. Thus, as with the two-level digital wave form of the second type of embodiment of the invention, with the wave form made up of maximums and minimums it is possible to apply congruence criteria with respect to the code syntax. It must be noted that, also in this case, the code syntax can be deduced by decoding a synchronism character (initial or final) of the code; in addition, by decoding the synchronism character, it is possible to determine the x-interval corresponding to a character on the wave form.

It is thus possible to divide the wave forms in sections corresponding to single characters. Then, at the selection step of the superimposed areas of the two wave forms, it will be easy to reject the values that are not congruent with the code syntax.

Some criteria that can typically be used with this wave form are, for example, the following:

the number of the maximums must coincide with the number of space elements of a character;

the number of the minimums must coincide with the number of bar elements of a character;

the value of each maximum must not be much higher than the value of the other maximums (otherwise, there is a reflection);

the value of each minimum must not be much lower than the value of the other minimums (otherwise, there is a shadow or a spot);

the distance between two consecutive maximums or between two consecutive minimums is equal to the length of two elements; thus, it cannot be much greater than the sum of the amplitudes of the two greatest elements, nor it can be much lower than the sum of the amplitudes of the two smallest elements.

Also in this case, it is possible to determine many other congruence criteria, more or less complex, always connected to the syntactic rules of the codes.

Finally, it must be noted that all the procedures described above are totally independent of the particular type of code to be read.

What is claimed is:

1. A method for reconstructing a bar code through consecutive scans, said bar code being made up of a plurality of elements having a first and a second reflectivity, said method comprising the following steps:

a) carrying out at least one scan of the bar code;

b) determining a reconstructed wave form representative of said at least one scan;

c) carrying out an actual scan of the bar code;

d) determining an actual wave form representative of said actual scan;

e) aligning said reconstructed and actual wave forms;

f) combining said aligned wave forms by updating said reconstructed wave form with said actual wave form.

2. The method according to claim 1, comprising the following step:

g) iteratively repeating the steps from (c) to (f) until the reconstructed wave form is representative of the entire bar code.

3. The method according to claim 1, wherein the steps (b), (d) are respectively followed by the following steps:

b') determining a first series of points on said reconstructed wave form;

d') determining a second series of points on said actual wave form.

4. The method according to claim 3, wherein said first and second series of points each have the same interval.

5. The method according to claim 3, wherein at least 1.5 points for each module of the bar code are provided in said series of points.

6. The method according to claim 5, wherein about 5 points for each module of the bar code are provided in said series of points.

7. The method according to claim 3, wherein the wave forms are analogue, and said series of points are obtained by sampling the analogue wave forms.

8. The method according to claim 3, wherein said series of points are luminosity values, expressed in grey scales, obtained from an image of the bar code.

9. The method according to claims 7, wherein said series of points are a subset of the points obtained by sampling said analogue wave forms.

10. The method according to claim 9, wherein said series of points are selected from the group comprising:

the maximums and the minimums of the points obtained by sampling the analogue wave forms;

the points in which the first derivative of the analogue wave forms crosses zero;

the points in which the second derivative of the analogue wave forms crosses zero.

11. The method according to claim 1, wherein the wave forms are two-level digitized wave forms, and said series of points are obtained by sampling the two-level digitized wave forms.

12. The method according to claim 1, wherein the alignment step (e) comprises the following steps:

forecasting an expected alignment;

carrying out a rough translation between the two wave forms on the basis of the expected alignment;

calculating a correlation index of the two wave forms;

carrying out a fine translation of a fixed number (M) of steps between the two wave forms in both directions;

calculating the correlation index for each fine translation;

determining—between the calculated correlation indexes—the index indicative of the minimum difference between the two wave forms;

aligning the two wave forms on the basis of the fine translation to which the determined correlation index corresponds;

updating the expected alignment value on the basis of the above fine alignment.

13. The method according to claim 12, wherein the correlation index is a distance index calculated as function of the summation of values function of the point-by-point difference between the values of the two wave forms.

14. The method according to claim 13, wherein the distance index is calculated according to one of the following formulas:

$$d(j) = \frac{\sum_{i=1}^{n} |ai - ri|}{n}, \forall j\varepsilon[-M, M] \quad (1)$$

$$d(j) = \frac{\sum_{i=1}^{n} (ai - ri)}{n}, \forall j\varepsilon[-M, M] \quad (2)$$

$$d(j) = \left[\frac{\sum_{i=1}^{n} |a_i - r_i|^p}{n}\right]^{\frac{1}{p}}, \forall j\epsilon[-M, M] \quad (3)$$

wherein i is the sampling index;

$a_i$ is the reflectivity value of the actual wave form for the i sampling point;

$r_i$ is the reflectivity value of the reconstructed wave form for the i sampling point;

n is an integer;

p is an integer;

M is an integer;

j is the variable standing for the 2M+1 alignments in the interval −M,M;

d(j) is the distance index calculated for each alignment j.

15. The method according to claim 13, wherein the distance index is calculated according to one of the following formulas:

$$d(j) = \frac{\sum_{i=1}^{n} |ax_i - rx_i| + \sum_{i=1}^{n} |ay_i - ry_i|}{n}, \forall j \in [-M, M] \quad (5)$$

$$d(j) = \frac{\sum_{i=1}^{n} (ax_i - rx_i)^2 + \sum_{i=1}^{n} (ay_i - ry_i)^2}{n}, \forall j \in [-M, M] \quad (6)$$

wherein i is the sampling index;

$ay_i$ is the reflectivity value of the actual wave form for the i sampling point;

$ax_i$ is the abscissa value of the actual wave form for the i sampling point;

$ry_i$ is the reflectivity value of the reconstructed wave form for the i sampling point;

$rx_i$ is the abscissa value of the reconstructed wave form for the i sampling point;

n is an integer;

M is an integer;

j is the variable standing for the 2M+1 alignments in the interval −M,M;

d(j) is the distance index calculated for each alignment j.

16. The method according to claim 12, wherein the correlation index is a proximity index, function of the summation of values function of the point-by-point product between the values of the two wave forms.

17. The method according to claim 16, wherein the proximity index is calculated according to the following formula:

$$p(j) = \frac{\sum_{i=1}^{n} (a_i * r_i)}{\sqrt{\sum_{i=1}^{n} a_i^2 * \sum_{i=1}^{n} r_i^2}}, \forall j \in [-M, M], \quad (4)$$

wherein i is the sampling index;

$a_i$ is the reflectivity value of the actual wave form for the i sampling point;

$r_i$ is the reflectivity value of the reconstructed wave form for the i sampling point;

n is an integer;

M is an integer;

j is the variable standing for the 2M+1 alignments in the interval −M,M;

p(j) is the proximity index calculated for each alignment j.

18. The method according to claim 12, wherein the calculation of the correlation index only considers those values of the two wave forms that are sufficiently close to one another.

19. The method according to claim 1, wherein the combining step (f) comprises the following steps:

fa) determining a central superimposition area between the aligned reconstructed wave form and the actual wave form, an initial area, in which there is only the reconstructed wave form, and a final area, in which there is only the actual wave form, fb) selecting, area by area, at least one of said reconstructed and actual wave forms;

fc) updating the reconstructed wave form on the basis of the selected wave form.

20. The method according to claim 19, wherein the selection step (fa) comprises:

in the initial area, point-by-point selection of the value of the reconstructed wave form;

in the central superimposition area, point-by-point selection of a value calculated on the basis of the corresponding values of the reconstructed wave form and of the actual wave form;

in the final area, point-by-point selection of the value of the actual wave form.

21. The method according to claim 20, wherein the calculated value is an average of the corresponding values of the reconstructed wave form and of the actual wave form.

22. The method according to claim 20, wherein at least two actual wave forms are memorised, and the calculated value is chosen through a voting mechanism between the values of the reconstructed and of the actual wave forms.

23. The method according to claim 20, wherein the differences two by two between the values relating to corresponding points of the wave forms are calculated; the values differing from the others by more than a fixed tolerance are rejected, and the calculated value is chosen as average of the not rejected values.

24. The method according to claim 20, wherein the calculated value is chosen through congruence rules with respect to the code syntax.

25. The method according to claim 12, comprising an initial acquisition step which comprises the following steps:

searching two consecutive wave forms in which there is a portion which can be representative of an end portion of a code preceded and/or followed by a possible quiet zone, acquiring said wave forms as first and second wave form;

aligning the second wave form with the first wave form;

determining a superimposition area between the second wave form and the first wave form;

carrying out an initial construction of the reconstructed wave form in the superimposition area with data that are function of the data of the first wave form and of the data of the second wave form;

carrying out an initial construction of the reconstructed wave form in the area following the superimposition area with the data of the second wave form;

carrying out an initial calculation of the expected alignment on the basis of the alignment between the first and the second wave form.

26. The method according to claim 25, wherein the alignment step of the second wave form with the first wave form comprises the following steps:

recognising the apparent quiet zones of the first and second wave form;

carrying out a rough translation between the two wave forms on the basis of their respective apparent quiet zones;

calculating a correlation index of the two wave forms;

carrying out a fine translation between the two wave forms, of a fixed number (M) of steps in both directions;

calculating the correlation index for each of the fine translations;

determining—between the calculated correlation indexes—the index indicative of the minimum difference between the two wave forms;

aligning the two wave forms on the basis of the fine translation to which the determined correlation index corresponds;

setting the expected alignment value on the basis of the above fine alignment.

27. The method according to claim 26, wherein the step of recognition of the apparent quiet zones comprises the following steps:

translating the second wave form with respect to the first wave form on the basis of the two respective possible initial quiet zones;

calculating a correlation index of the two wave forms;

translating the second wave form with respect to the first wave form on the basis of the two respective possible final quiet zones;

calculating a correlation index of the two wave forms;

determining—between the calculated correlation indexes—the index indicative of the minimum difference between the two wave forms;

recognising as apparent quiet zone of the code the probable quiet zone—initial or final—that has caused the translation to which the determined correlation index corresponds.

28. The method according to claim 26, wherein the correlation index is a distance index calculated as function of the summation of values function of the point-by-point difference between the values of the two wave forms.

29. A method for reconstructing a bar code through consecutive scans, said bar code being made up of a plurality of elements having a first and a second reflectivity, said method comprising the following steps:

a) carrying out at least one scan of the bar code;

b) determining a reconstructed wave form representative of said at least one scan;

c) carrying out an actual scan of the bar code;

d) determining an actual wave form representative of said actual scan;

e) aligning said reconstructed and actual wave forms comprising the following substeps:

e1) forecasting an expected alignment;

e2) carrying out a rough translation between the two wave forms on the basis of the expected alignment e3) calculating a correlation index of the two wave forms;

e4) carrying out a fine translation of a fixed number (M) of steps between the two wave forms in both directions;

e5) calculating the correlation index for each fine translation;

e6) determining, between the calculated correlation indexes, the index indicative of the minimum difference between the two wave forms;

e7) aligning the two wave forms on the basis of the fine translation to which the determined correlation index corresponds; and e8) updating the expected alignment value on the basis of the above fine alignment;

f) combining said aligned wave forms by updating said reconstructed wave form with said actual wave form.

30. A method for reconstructing a bar code through consecutive scans, said bar code being made up of a plurality of elements having a first and a second reflectivity, said method comprising the following steps:

a) carrying out at least one scan of the bar code;

b) determining a reconstructed wave form representative of said at least one scan;

c) carrying out an actual scan of the bar code;

d) determining an actual wave form representative of said actual scan;

e) aligning said reconstructed and actual wave forms comprising the following substeps:

e1) forecasting an expected alignment;

e2) carrying out a rough translation between the two wave forms on the basis of the expected alignment e3) calculating a correlation index of the two wave forms;

e4) carrying out a fine translation of a fixed number (M) of steps between the two wave forms in both directions;

e5) calculating the correlation index for each fine translation;

e6) determining, between the calculated correlation indexes, the index indicative of the minimum difference between the two wave forms;

e7) aligning the two wave forms on the basis of the fine translation to which the determined correlation index corresponds; and e8) updating the expected alignment value on the basis of the above fine alignment;

f) combining said aligned wave forms by updating said reconstructed wave form with said actual wave form; and g) iteratively repeating the steps from (c) to (f) until the reconstructed wave form is representative of the entire bar code.

31. A method for reconstructing a bar code through consecutive scans, said bar code being made up of a plurality of elements having a first and a second reflectivity, said method comprising the following steps:

a) carrying out at least one scan of the bar code;

b) determining a reconstructed wave form representative of said at least one scan;

c) carrying out an actual scan of the bar code;

d) determining an actual wave form representative of said actual scan;

e) aligning said reconstructed and actual wave forms comprising the following substeps:

e1) forecasting an expected alignment;

e2) carrying out a rough translation between the two wave forms on the basis of the expected alignment e3) calculating a correlation index of the two wave forms;

e4) carrying out a fine translation of a fixed number (M) of steps between the two wave forms in both directions;

e5) calculating the correlation index for each fine translation;

e6) determining—between the calculated correlation indexes—the index indicative of the minimum difference between the two wave forms;

e7) aligning the two wave forms on the basis of the fine translation to which the determined correlation index corresponds; and e8) updating the expected alignment value on the basis of the above fine alignment;

f) combining said aligned wave forms by updating said reconstructed wave form with said actual wave form comprising the following substeps:

f1) determining a central superimposition area between the aligned reconstructed wave form and the actual wave form, an initial area, in which there is only the reconstructed wave form, and a final area, in which there is only the actual wave form, f2) selecting, area by area, at least one of said reconstructed and actual waveforms;

f3) updating the reconstructed wave form on the basis of the selected wave form;

g) iteratively repeating the steps from (c) to (f) until the reconstructed wave form is representative of the entire bar code.

32. A method for reconstructing a bar code through consecutive scans, said bar code being made up of a plurality of elements having a first and a second reflectivity, said method comprising the following steps:

a) an initial acquisition step which comprises the following substeps:

a1) searching two consecutive wave forms in which there is a portion which can be representative of an end portion of a code preceded and/or followed by a possible quiet zone, a2) acquiring said wave forms as first and second wave form;

a3) aligning the second wave form with the first wave form;

a4) determining a superimposition area between the second wave form and the first wave form;

a5) carrying out an initial construction of the reconstructed wave form in the superimposition area with data that are function of the data of the first wave form and of the data of the second wave form;

a6) carrying out an initial construction of the reconstructed wave form in the area following the superimposition area with the data of the second wave form;

a7) carrying out an initial calculation of the expected alignment on the basis of the alignment between the first and the second wave form;

b) carrying out at least one scan of the bar code;

c) determining a reconstructed wave form representative of said at least one scan;

d) carrying out an actual scan of the bar code;

e) determining an actual wave form representative of said actual scan;

f) aligning said reconstructed and actual wave forms comprising the following substeps:

f1) forecasting an expected alignment;

f2) carrying out a rough translation between the two wave forms on the basis of the expected alignment f3) calculating a correlation index of the two wave forms;

f4) carrying out a fine translation of a fixed number (M) of steps between the two wave forms in both directions;

f5) calculating the correlation index for each fine translation;

f6) determining—between the calculated correlation indexes—the index indicative of the minimum difference between the two wave forms;

f7) aligning the two wave forms on the basis of the fine translation to which the determined correlation index corresponds; and f8) updating the expected alignment value on the basis of the above fine alignment;

g) combining said aligned wave forms by updating said reconstructed wave form with said actual wave form, comprising the following steps:

g1) determining a central superimposition area between the aligned reconstructed wave form and the actual wave form, an initial area, in which there is only the reconstructed wave form, and a final area, in which there is only the actual wave form, g2) selecting, area by area, at least one of said reconstructed and actual waveforms;

g3) updating the reconstructed wave form on the basis of the selected wave form;

h) iteratively repeating the steps from (d) to (g) until the reconstructed wave form is representative of the entire bar code.

33. The method according to claim 32, wherein the alignment step a3) comprising the alignment of the second wave form with the first wave form comprises the following substeps:

a31) recognizing the apparent quiet zones of the first and second wave form;

a32) carrying out a rough translation between the two wave forms on the basis of their respective apparent quiet zones;

a33) calculating a correlation index of the two wave forms;

a34) carrying out a fine translation between the two wave forms, of a fixed number (M) of steps in both directions;

a35) calculating the correlation index for each of the fine translations;

a36) determining—between the calculated correlation indexes—the index indicative of the minimum difference between the two wave forms;

a37) aligning the two wave forms on the basis of the fine translation to which the determined correlation index corresponds; and a38) setting the expected alignment value on the basis of the above fine alignment.

34. The method according to claim 33, wherein the substep of recognition of the apparent quiet zones a31) comprises the following substeps:

a311) translating the second wave form with respect to the first wave form on the basis of the two respective possible initial quiet zones;

a312) calculating a correlation index of the two wave forms;

a313) translating the second wave form with respect to the first wave form on the basis of the two respective possible final quiet zones;

a314) calculating a correlation index of the two wave forms;

a315) determining, between the calculated correlation indexes, the index indicative of the minimum difference between the two wave forms; and a316) recognizing as apparent quiet zone of the code the probable quiet zone, initial or final, that has caused the translation to which the determined correlation index corresponds.

35. Method for reconstructing a bar code through consecutive scans, said bar code being made up of a plurality of elements having a first and a second reflectivity, said method comprising the steps of:

a) carrying out at least one scan of the bar code;

b) determining a sampled reconstructed wave form representative of said at least one scan, said sampled reconstructed wave form comprising a first series of points;

c) carrying out an actual scan of the bar code;

d) determining a sampled actual wave form representative of said actual scan, said sampled actual wave form comprising a second series of points;

e) aligning said sampled reconstructed and actual wave forms;

f) combining said aligned wave forms by updating said sampled reconstructed wave form with said sampled actual wave form.

36. Method according to claim 35, comprising the following step:

g) iteratively repeating the steps from (c) to (f) until the reconstructed wave form is representative of the entire bar code.

37. Method according to claim 35, wherein said first and second series of points each have the same interval.

38. Method according to claim 35, wherein at least 1.5 points for each module of the bar code are provided in said series of points.

39. Method according to claim 38, wherein about 5 points for each module of the bar code are provided in said series of points.

40. Method according to claim 35, wherein the wave forms are analogue, and said series of points are obtained by sampling the analogue wave forms.

41. Method according to claim 35, wherein said series of points are luminosity values, expressed in grey scales, obtained from an image of the bar code.

42. Method according to claim 40, wherein said series of points are a subset of the points obtained by sampling said analogue wave forms.

43. Method according to claim 42, wherein said series of points are selected from the group comprising:

the maximums and the minimums of the points obtained by sampling the analogue wave forms;

the points in which the first derivative of the analogue wave forms crosses zero;

the points in which the second derivative of the analogue wave forms crosses zero.

* * * * *